United States Patent
Wood et al.

(10) Patent No.: US 12,497,162 B2
(45) Date of Patent: Dec. 16, 2025

(54) AERODYNAMIC TIP FEATURE

(71) Applicant: General Electric Company, Schenectady, NY (US)

(72) Inventors: Trevor Howard Wood, Clifton Park, NY (US); Kishore Ramakrishnan, Rexford, NY (US)

(73) Assignee: General Electric Company, Evendale, OH (US)

( * ) Notice: Subject to any disclaimer, the term of this patent is extended or adjusted under 35 U.S.C. 154(b) by 610 days.

(21) Appl. No.: 17/325,592

(22) Filed: May 20, 2021

(65) Prior Publication Data

US 2021/0269144 A1    Sep. 2, 2021

Related U.S. Application Data

(62) Division of application No. 16/033,583, filed on Jul. 12, 2018, now Pat. No. 11,034,436.

(51) Int. Cl.
  *B64C 23/06*       (2006.01)
(52) U.S. Cl.
  CPC ................... *B64C 23/069* (2017.05)
(58) Field of Classification Search
  CPC ....... B64C 23/069; B64C 5/08; B64C 23/076; B64C 23/00; B64C 23/06; B64C 23/065; B64C 3/52; B64C 5/10; Y02T 50/10
  See application file for complete search history.

(56) References Cited

U.S. PATENT DOCUMENTS

| | | | | |
|---|---|---|---|---|
| 1,466,551 A | * | 8/1923 | Thurston | B64C 23/076 244/90 R |
| 1,841,921 A | * | 1/1932 | Spiegel | B64C 23/069 244/199.4 |
| 1,888,418 A | * | 11/1932 | Adams | B64C 23/076 244/65 |

(Continued)

FOREIGN PATENT DOCUMENTS

| | | |
|---|---|---|
| CN | 2284731 Y | 6/1998 |
| CN | 102975851 A | 3/2013 |

(Continued)

OTHER PUBLICATIONS

Arif et al., Reduction of Induced Drag Using Wing Tip Propeller, International Journal of Research, https://edupediapublications.org/journals/index.php/IJR/article/view/8354/8105, vol. 4, Issue 8, Jul. 2017, pp. 952-956.

(Continued)

*Primary Examiner* — Medhat Badawi
(74) *Attorney, Agent, or Firm* — Dority & Manning, P.A.

(57) ABSTRACT

An aircraft defines a longitudinal direction, a vertical direction, and a transverse direction. The aircraft includes a fuselage; and a wing extending from the fuselage generally along the transverse direction and defining an outer end along the transverse direction. The wing includes a wing tip assembly at the outer end of the wing, the wing tip assembly defining an axis substantially parallel to the longitudinal direction of the aircraft and a circumferential direction extending about the axis, the wing tip assembly including at least three stationary guide vanes spaced along the circumferential direction from one another.

12 Claims, 6 Drawing Sheets

(56) References Cited

U.S. PATENT DOCUMENTS

| | | | | |
|---|---|---|---|---|
| 2,743,888 | A * | 5/1956 | Lippisch | B64C 23/076 244/46 |
| 3,900,176 | A * | 8/1975 | Everett | B64C 27/30 244/6 |
| 4,017,041 | A * | 4/1977 | Nelson | B64C 23/076 416/142 |
| 4,172,574 | A * | 10/1979 | Spillman | B64C 23/072 114/272 |
| 4,247,063 | A * | 1/1981 | Jenkins | B64C 5/08 244/199.4 |
| 4,671,473 | A * | 6/1987 | Goodson | B64C 23/076 244/46 |
| 4,722,499 | A * | 2/1988 | Klug | B64C 23/076 244/45 R |
| 5,934,612 | A * | 8/1999 | Gerhardt | B64C 23/065 244/58 |
| 5,992,793 | A * | 11/1999 | Perry | B64C 27/463 244/17.11 |
| 6,227,487 | B1 * | 5/2001 | Clark | B64C 9/00 244/99.12 |
| 6,345,790 | B1 * | 2/2002 | Brix | B64C 23/076 244/46 |
| 7,264,200 | B2 * | 9/2007 | Bussom | B64C 23/072 416/24 |
| 8,136,757 | B2 * | 3/2012 | Kelm | B64C 11/00 244/75.1 |
| 8,342,456 | B2 * | 1/2013 | Mann | B64C 23/069 244/199.4 |
| 8,382,041 | B1 * | 2/2013 | Yechout | B64C 23/069 244/199.4 |
| 8,651,431 | B1 * | 2/2014 | White | B64C 23/072 244/46 |
| 9,199,727 | B2 * | 12/2015 | Wright | B64C 3/58 |
| 9,623,960 | B2 * | 4/2017 | Devenyi | B64C 39/10 |
| 9,988,142 | B2 * | 6/2018 | Heller | B64C 23/069 |
| 10,526,073 | B2 * | 1/2020 | Theurich | B64C 23/065 |
| 10,981,643 | B2 * | 4/2021 | Cross | B64C 23/072 |
| 11,034,436 | B2 * | 6/2021 | Wood | B64C 23/069 |
| 11,279,469 | B2 * | 3/2022 | Petscher | B64C 23/069 |
| 11,312,481 | B2 * | 4/2022 | Petscher | B64C 3/10 |
| 11,396,368 | B2 * | 7/2022 | Petscher | B64C 23/072 |
| 11,427,307 | B2 * | 8/2022 | Petscher | B64C 23/069 |
| 2006/0144992 | A1 * | 7/2006 | Jha | B64C 3/40 244/46 |
| 2007/0262205 | A1 * | 11/2007 | Grant | B64C 23/072 244/199.2 |
| 2008/0191099 | A1 * | 8/2008 | Werthmann | B64C 23/072 244/199.4 |
| 2008/0308683 | A1 * | 12/2008 | Sankrithi | B64C 23/076 244/199.4 |
| 2011/0101169 | A1 * | 5/2011 | Schaber | B64C 23/065 244/199.3 |
| 2012/0104183 | A1 * | 5/2012 | Narasimha | B64C 39/10 244/34 R |
| 2012/0288374 | A1 * | 11/2012 | Avellan | B63H 1/265 416/223 R |
| 2013/0315701 | A1 * | 11/2013 | Neuteboom | B64C 11/00 415/209.1 |
| 2015/0183518 | A1 * | 7/2015 | Stuckl | B64C 3/10 903/902 |
| 2017/0057631 | A1 * | 3/2017 | Fredericks | B64C 11/50 |
| 2017/0152020 | A1 * | 6/2017 | Wood | F01D 5/141 |
| 2018/0334253 | A1 * | 11/2018 | Geneste | B64C 3/10 |
| 2020/0017200 | A1 * | 1/2020 | Wood | B64C 23/069 |
| 2021/0221536 | A1 * | 7/2021 | Minh Chung | B64C 1/26 |
| 2021/0269144 | A1 * | 9/2021 | Wood | B64C 23/069 |
| 2021/0269145 | A1 * | 9/2021 | Wood | B64C 23/072 |
| 2022/0236040 | A1 * | 7/2022 | Davidson | F42B 10/04 |

FOREIGN PATENT DOCUMENTS

| | | |
|---|---|---|
| CN | 205469774 U | 8/2016 |
| DE | 19706669 A1 | 8/1998 |
| WO | WO2013/083570 A1 | 6/2013 |

OTHER PUBLICATIONS

Hackett, Vortex Drag Reduction By AFT-Mounted Diffusing Vanes, Lockheed-Georgina Company, ICAS-80-13.4, 12 pages. http://www.icas.org/ICAS_ARCHIVE/ICAS1980/ICAS-80-13.4.pdf.

Patterson et al., Effect of a Wing-Tip Mounted Pusher Turboprop on The Aerodynamic Characteristics of a Semi-Span Wing, ResearchGate, 1985. (Abstract Only) https://ntrs.nasa.gov/search.jsp?R=19850057549.

Patterson et al., Evaluation of Installed Performance of a Wing-Tip-Mounted Pusher Turboprop On A Semispan Wing, NASA Langley Research Center, NASA-TP-2739, L-16252, Aug. 1, 1987. https://ntrs.nasa.archive/nasa/casi.ntrs.nasa.gov/19870016608.pdf.

Wentz, Jr., et al., Wing-Tip Vanes as Vortex Attenuation and Induced Drag Reduction Devices, NASA Gov, N76-11012, Document ID 19760003924, Jan. 1, 1975, 12 Pages. https://ntrs.nasa.gov/casi.ntrs.nasa.gov/19760003924.pdf.

* cited by examiner

AERODYNAMIC TIP FEATURE

CROSS-REFERENCE TO RELATED APPLICATIONS

This application is a divisional application of U.S. patent application Ser. No. 16/033,583 filed Jul. 12, 2018, the contents of which are hereby incorporated by reference in their entirety.

FIELD

The present subject matter relates generally to an aircraft having a wing with a wing tip assembly for reducing an induced drag on the aircraft.

BACKGROUND

A conventional commercial aircraft generally includes a fuselage, a pair of wings, and a propulsion system that provides thrust. The propulsion system typically includes at least two aircraft engines, such as turbofan jet engines. Each turbofan jet engine is mounted to a respective one of the wings of the aircraft, such as in a suspended position beneath the wing, separated from the wing and fuselage. Such a configuration allows for the turbofan jet engines to interact with separate, freestream airflows that are not impacted by the wings and/or fuselage. This configuration can reduce an amount of turbulence and flow distortion within the air entering an inlet of each respective turbofan jet engine, which has a positive effect on a net propulsive thrust of the engine.

However, a drag on the aircraft including the turbofan jet engines also affects the net propulsive thrust. A total amount of drag on the aircraft, including skin friction and induced drag, is generally proportional to a difference between a freestream velocity of air approaching the aircraft and an average velocity of a wake downstream from the aircraft that is produced due to the drag on the aircraft.

Positioning a winglet, or alternatively a split winglet, at an outer end of each of the wings of the aircraft can reduce an induced drag on the aircraft by reducing the kinetic energy of the airflow that is lost to swirl over the outer end of the wing (i.e., "de-swirling" such airflow). However, the benefit provided by such winglet or split winglet is limited due to the amount of de-swirling the winglet or split winglet is capable of providing. Accordingly, an aircraft including features for further reducing an induced drag on the aircraft would be useful.

BRIEF DESCRIPTION

Aspects and advantages of the invention will be set forth in part in the following description, or may be obvious from the description, or may be learned through practice of the invention.

In one exemplary embodiment of the present disclosure, an aircraft is provided. The aircraft defines a longitudinal direction, a vertical direction, and a transverse direction. The aircraft includes a fuselage; and a wing extending from the fuselage generally along the transverse direction and defining an outer end along the transverse direction. The wing includes a wing tip assembly at the outer end of the wing, the wing tip assembly defining an axis substantially parallel to the longitudinal direction of the aircraft and a circumferential direction extending about the axis, the wing tip assembly including at least three stationary guide vanes spaced along the circumferential direction from one another.

In certain exemplary embodiments the wing tip assembly includes at least 4 and less than 20 stationary guide vanes spaced along the circumferential direction from one another.

In certain exemplary embodiments each of the stationary guide vanes of the wing tip assembly are spaced substantially equally from one another along the circumferential direction.

In certain exemplary embodiments each of the stationary guide vanes of the wing tip assembly define a length, and wherein the lengths of at least two of the stationary guide vanes of the wing tip assembly are substantially equal to one another.

For example, in certain exemplary embodiments the lengths of each of the stationary guide vanes of the wing tip assembly are substantially equal to one another.

In certain exemplary embodiments the stationary guide vanes of the wing tip assembly define a variable spacing between one another along the circumferential direction.

For example, in certain exemplary embodiments a spacing between each adjacent pair of stationary guide vanes is less than an angle defined by the equation $360°/(n+1)+180°/(n+1)$, and greater than an angle defined by the equation $360°/(n+1)-180°/(n+1)$, where "n" is equal to the number of stationary guide vanes.

In certain exemplary embodiments the stationary guide vanes of the wing tip assembly includes a first set of stationary guide vanes and a second set of stationary guide vanes, wherein the first set of stationary guide vanes each define a first length, wherein the second set of stationary guide vanes each define a second length, and wherein the first length is greater than the second length.

For example, in certain exemplary embodiments the first set of stationary guide vanes is alternatingly spaced with the second set of stationary guide vanes.

In certain exemplary embodiments the wing further includes a wing body, wherein the wing tip assembly is coupled to, or formed integrally with, the wing body, and wherein the at least 3 stationary guide vanes of the wing tip assembly are further spaced along the circumferential direction from the wing body.

In certain exemplary embodiments the stationary guide vanes of the wing tip assembly are each fixed in position.

In certain exemplary embodiments the wing further includes a wing body defining an aft edge, and wherein each of the stationary guide vanes of the wing tip assembly defines an aft edge, and wherein the aft edges of the stationary guide vanes are at least partially aligned with the aft edge of the wing body or positioned at least partially aft of the aft edge of the wing body.

In certain exemplary embodiments the wing is a first wing, and the aircraft further includes a second wing extending from the fuselage generally along the transverse direction on an opposite side of the fuselage from the first wing, wherein the second wing also defines an outer end along the transverse direction and includes a wing tip assembly at the outer end, wherein the wing tip assembly of the second wing defines an axis substantially parallel to the longitudinal direction of the aircraft and a circumferential direction extending about the axis, the wing tip assembly of the second wing also including at least three stationary guide vanes spaced from one another along the circumferential direction of the wing tip assembly of the second wing.

In certain exemplary embodiments a first stationary guide vane of the at least three stationary guide vanes of the wing tip assembly defines a leading edge having a substantially concave shape.

In certain exemplary embodiments a first stationary guide vane of the at least three stationary guide vanes of the wing tip assembly defines a leading edge and a trailing edge, wherein the wing defines a trailing edge at the outer end, and wherein the leading edge of the first stationary guide vane is at least partially forward of the trailing edge of the wing, and wherein the trailing edge of the first stationary guide vane is at least partially aft of the trailing edge of the wing.

In one exemplary embodiment of the present disclosure, an engine is provided. The engine includes an airfoil extending along a transverse direction and defining an outer end along the transverse direction, the airfoil including an airfoil tip assembly at the outer end of the airfoil, the airfoil tip assembly defining an axis and a circumferential direction extending about the axis, the airfoil tip assembly including at least three stationary guide vanes spaced along the circumferential direction from one another.

In certain exemplary embodiments the stationary guide vanes of the wing tip assembly define a variable spacing between one another along the circumferential direction.

For example, in certain exemplary embodiments a spacing between each adjacent pair of stationary guide vanes is less than an angle defined by the equation $360°/(n+1)+180°/(n+1)$, and greater than an angle defined by the equation $360°/(n+1)-180°/(n+1)$, where "n" is equal to the number of stationary guide vanes.

In certain exemplary embodiments a first stationary guide vane of the at least three stationary guide vanes of the wing tip assembly defines a leading edge having a substantially concave shape.

In certain exemplary embodiments a first stationary guide vane of the at least three stationary guide vanes of the airfoil tip assembly defines a leading edge and a trailing edge, wherein the airfoil defines a trailing edge at the outer end, and wherein the leading edge of the first stationary guide vane is at least partially forward of the trailing edge of the airfoil, and wherein the trailing edge of the first stationary guide vane is at least partially aft of the trailing edge of the airfoil.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION OF THE INVENTION

Figure 1:
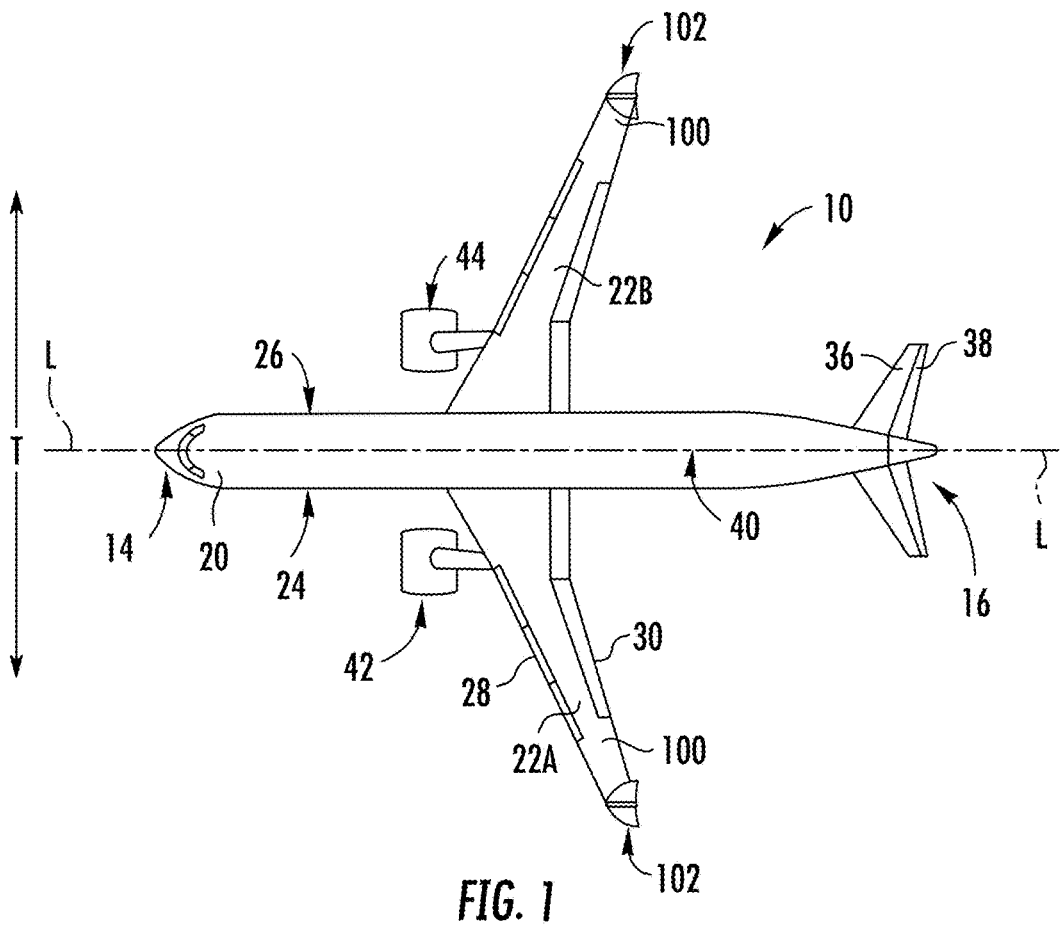
FIG. 1 is a top view of an aircraft according to various exemplary embodiments of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "forward" and "aft" refer to relative positions of an aircraft or vehicle, and refer to the normal operational attitude of the aircraft or vehicle. For example, with regard to an aircraft, forward refers to a position closer to a nose of the aircraft and aft refers to a position closer to a tail of the aircraft.

The terms "upstream" and "downstream" refer to the relative direction with respect to fluid flow. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Figure 2:
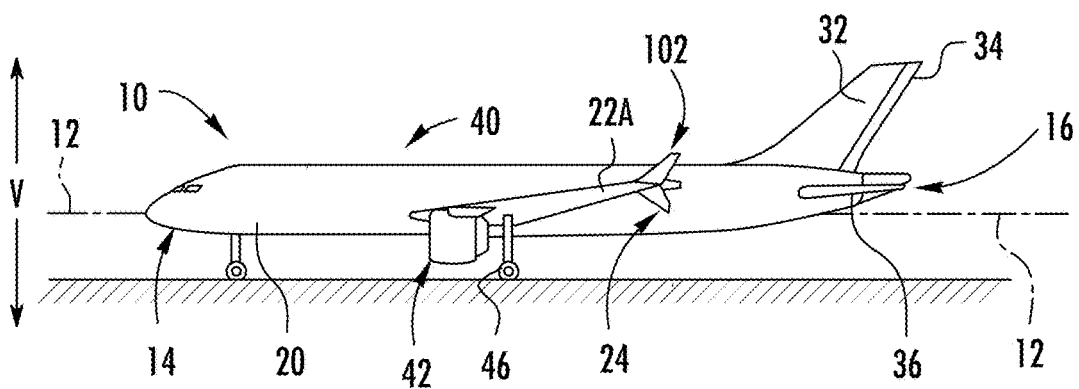
FIG. 2 is a port side view of the exemplary aircraft of FIG. 1.

Referring now to the drawings, wherein identical numerals indicate the same elements throughout the figures, FIG. 1 provides a top view of an exemplary aircraft 10 as may incorporate various embodiments of the present invention. FIG. 2 provides a port side 24 view of the aircraft 10 as illustrated in FIG. 1. As shown in FIGS. 1 and 2 collectively, the aircraft 10 defines a longitudinal direction L that extends therethrough, a vertical direction V, a transverse direction T, a forward end 14, and an aft end 16.

Moreover, the aircraft 10 includes a fuselage 20, extending longitudinally from the forward end 14 of the aircraft 10 towards the aft end 16 of the aircraft 10, and a pair of wings 22, or rather, a first wing 22A and a second wing 22B. The first wing 22A extends outwardly from the fuselage 20 generally along the transverse direction T with respect to the longitudinal direction L, from the port side 24 of the fuselage 20. Further, the second wing 22B similarly extends outwardly from the fuselage 20, generally along the transverse direction T with respect to the longitudinal direction L, from a starboard side 26 of the fuselage 20. Each of the wings 22A, 22B for the exemplary embodiment depicted includes one or more leading edge flaps 28 and one or more trailing edge flaps 30. Moreover, as will be explained in greater detail below, each of the wings 22A, 22B generally includes a wing body 100 and a wing tip assembly 102.

Referring still to the exemplary aircraft 10 of FIGS. 1 and 2, the aircraft 10 further includes a vertical stabilizer 32 having a rudder flap 34 for yaw control, and a pair of horizontal stabilizers 36, each having an elevator flap 38 for pitch control. The fuselage 20 additionally includes an outer surface 40. However, it should be appreciated that in other exemplary embodiments of the present disclosure, the aircraft 10 may additionally or alternatively include any other suitable configuration of stabilizers that may or may not extend directly along the vertical direction V or horizontal/transverse direction T. In addition, alternative stabilizers may be any suitable shape, size, configuration, or orientation while remaining within the scope of the present subject matter.

The exemplary aircraft 10 of FIGS. 1 and 2 also includes a propulsion system. The exemplary propulsion system depicted includes a plurality of aircraft engines, at least one of which mounted to each of the pair of wings 22A, 22B. Specifically, the plurality of aircraft engines includes a first aircraft engine 42 mounted to the first wing 22A and a second aircraft engine 44 mounted to the second wing 22B. In at least certain exemplary embodiments, the aircraft engines 42, 44 may be configured as turbofan jet engines suspended beneath the wings 22A, 22B in an under-wing configuration. Alternatively, however, in other exemplary embodiments any other suitable aircraft engine may be provided. For example, in other exemplary embodiments the first and/or second aircraft engines 42, 44 may alternatively be configured as turbojet engines, turboshaft engines, turboprop engines, etc.

Figure 3:
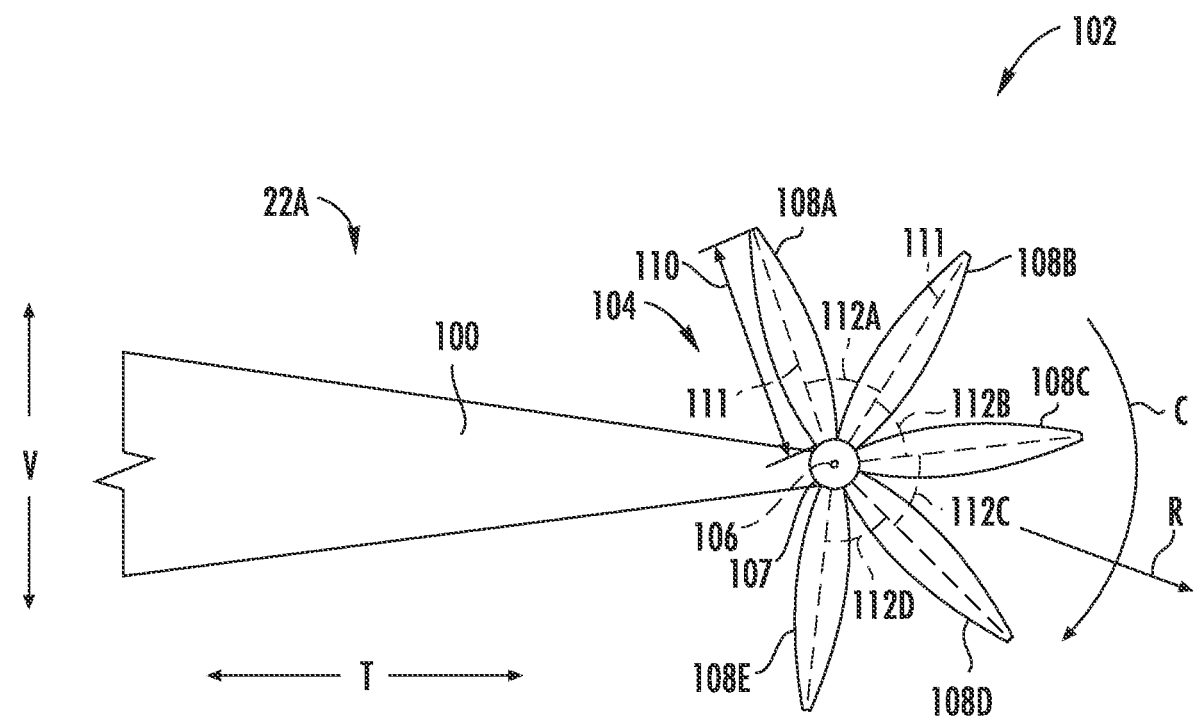
FIG. 3 is a close-up, forward view of an outer end of a first wing of the exemplary aircraft of FIG. 1.
Figure 4:
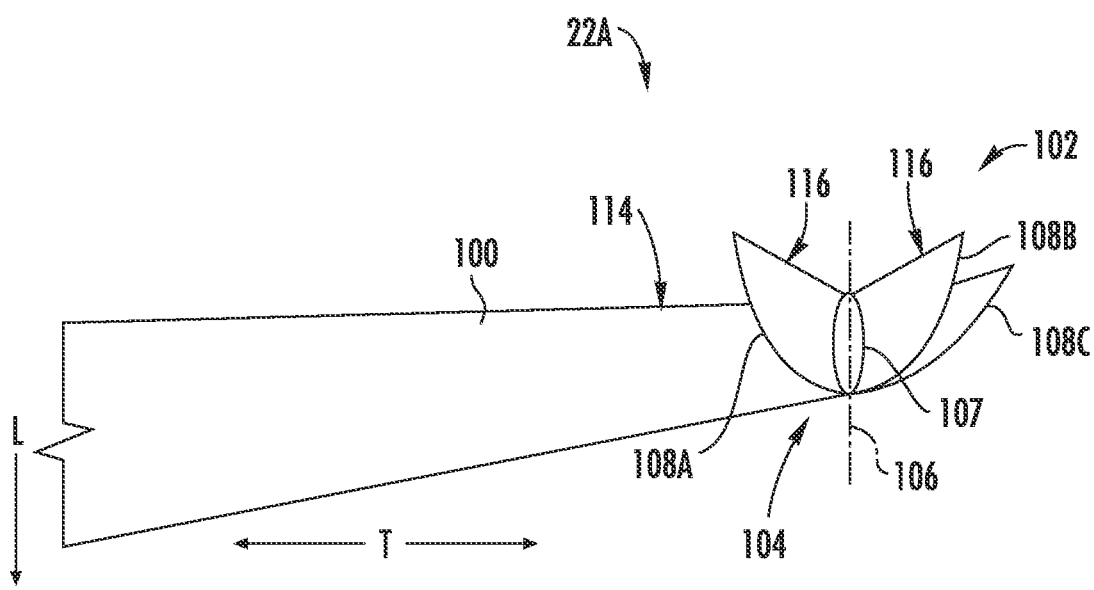
FIG. 4 is a close-up, top view of the outer end of the first wing of the exemplary aircraft of FIG. 1.

Referring now to FIGS. 3 and 4, the first wing 22A of the exemplary aircraft 10 described above with reference to FIGS. 1 and 2 will be described in greater detail. As stated, the first wing 22A extends generally along the transverse direction T, defining an outer end 104 along the transverse direction T (i.e., outer relative to the fuselage 20). Additionally, the first wing 22A generally includes a wing body 100 and a wing tip assembly 102. The wing tip assembly 102 is positioned at the outer end 104 of the first wing 22A, and more specifically, is coupled to, or formed integrally with, the wing body 100 of the outer end 104 of the first wing 22A. For example, in certain exemplary embodiments, one or more portions of the wing tip assembly 102 may be formed integrally with the wing body 100, or alternatively, may be attached to the wing body 100 in any suitable manner.

As is shown, the wing tip assembly 102 defines an axis 106, which it is substantially parallel to a longitudinal direction L of the aircraft 10 for the embodiment shown, as well as a circumferential direction C (see FIG. 3) extending about the axis 106 and a radial direction R relative to the axis 106. Moreover, the wing tip assembly 102 includes a hub 107 and a plurality of stationary guide vanes 108 coupled to the hub 107. Accordingly, it will be appreciated that the axis 102 refers generally to a fixed reference line through the hub 107 (i.e., for the embodiments including the hub 107), and more specifically at an average intersection of span reference lines 111 (defined below) of the stationary guide vanes 108, as will be explained in more detail below.

As will also be appreciated from FIGS. 3 and 4, the plurality of stationary guide vanes 108 are spaced along the circumferential direction C from one another. Notably, for the embodiment depicted, the plurality of stationary guide vanes 108 are additionally spaced along the circumferential direction C from the wing body 100. More specifically, for the exemplary embodiment depicted, the wing tip assembly 102 includes at least three (3) stationary guide vanes 108 spaced along the circumferential direction C from one another. For example, in certain exemplary embodiments, the wing tip assembly 102 may include at least four (4) and less than twenty (20) stationary guide vanes 108 spaced along the circumferential direction C from one another. For the embodiment depicted, each of the plurality of stationary guide vanes 108 of the wing tip assembly 102 are fixed in position. Accordingly, the plurality of stationary guide vanes 108 for the embodiment depicted are not configured to vary in, e.g., spacing, orientation, etc.

It will be appreciated, however, that in other exemplary embodiments, the wing tip assembly 102 may include as few as two stationary guide vanes 108 spaced along the circumferential direction C. Moreover, in still other exemplary embodiments, the wing tip assembly 102 may not include a separate hub 107, and instead each of the plurality of stationary guide vanes 108 may be directly attached at a base to, e.g., one another, the wing body 100, or a combination thereof. With such an exemplary embodiment, as noted above, the axis 106 of the wing tip assembly 102 may refer to an average intersection of the span reference lines 111 (defined below) of the stationary guide vanes 108.

Referring now particularly to FIG. 3, it will be appreciated that each of the stationary guide vanes 108 of the wing tip assembly 102 defines a length, or span, 110 generally along the radial direction R and a span reference line 111. As used herein, with reference to the stationary guide vanes 108, the length 110 refers to a straight-line span of the stationary guide vane 108 along the radial direction R. Additionally, the span reference line 111 refers to a straight reference line extending generally lengthwise through an average center of mass of the stationary guide vane 108. Further, for the embodiment depicted, the lengths 110 of at least two stationary guide vanes 108 of the plurality of stationary guide vanes 108 of the wing tip assembly 102 are substantially equal to one another. More specifically, for the embodiment of FIG. 3, the lengths 110 of each of the plurality of stationary guide vanes 108 of the wing tip assembly 102 are substantially equal to one another.

Further, as was noted above, and as is depicted in FIG. 3, each of the stationary guide vanes 108 of the wing tip assembly 102 are spaced along the circumferential direction C from one another and from the wing body 100. For the embodiment depicted, each of the stationary guide vanes 108 of the wing tip assembly 102 are spaced substantially equally from one another along the circumferential direction C. It will be appreciated, that as used herein, the term "spacing" with reference to the plurality of stationary guide vanes 108 refers to an angular spacing 112 between adjacent stationary guide vanes 108 relative to the axis 106 of the wing tip assembly 102, and more specifically, an angular spacing between the span reference lines 111 of adjacent stationary guide vanes 108. Additionally, as used herein, the term "spaced substantially equally" with reference to the plurality stationary guide vanes 108 of the wing tip assembly 102, refers to the angular spacing 112 between each adjacent stationary guide vane 108 between the first and last stationary guide vanes 108 being substantially equal. Notably, such does not require the angular spacing 112 between the last and first stationary guide vanes 108 to be substantially equal. Accordingly, for the embodiment of FIG. 3, wherein there are five stationary guide vanes 108, the angular spacing 112A between a first stationary guide vane 108A and a second stationary guide vane 108B, an angular spacing 112B between the second stationary guide vane 108B and a third stationary guide vane 108C, an angular spacing 112C between the third stationary guide vane 108C and the fourth stationary guide vane 108D, and an angular spacing 112D between the fourth stationary guide vane 108D and a fifth stationary guide vane 108E are all substantially equal. However, an angular spacing (not labeled) between the fifth and first stationary guide vanes 108E, 108A does not need to be equal to the other spacings 112A-112D (due to, e.g., the presence of the wing 22A).

More specifically, for the embodiment depicted, the spacings 112A-112D between each of the stationary guide vanes 108A-108E are all substantially equal to 360 degrees divided by n plus one (360°/(n+1)), where "n" is the number of stationary guide vanes 108 (i.e., 5 for the embodiment shown (the wing 22A is not counted)). Notably, the spacing is determined by dividing by "n+1" as opposed to just "n" because the wing body 100 may function as another stationary guide vane 108, but is not included in the count of stationary guide vanes 108. Accordingly, for the embodiment depicted, the spacing between each of the stationary guide vanes 108A-108E is substantially equal to sixty degrees (60°). However, in other embodiments including other numbers of stationary guide vanes 108, if they were equally spaced, the spacing may be different (according to the formula 360°/(n+1)).

Moreover, it will be appreciated that the plurality of stationary guide vanes 108 of the wing tip assembly 102 of the first wing 22A are positioned at an aft end of the first wing 22A to more effectively de-swirl an airflow over the outer end 104 of the first wing 22A, as will be described in more detail below. More specifically, referring particularly briefly to FIG. 4, the exemplary wing body 100 of the first wing 22A defines an aft edge 114, and each of the stationary guide vanes 108 of the wing tip assembly 102 also defines an aft edge 116. For the embodiment shown, the aft edges 116 of the stationary guide vanes 108 are at least partially aligned with the aft edge 114 of the wing body 100, or positioned at least partially aft of the aft edge 114 of the wing body 100. More specifically, for the embodiment depicted, the aft edges 116 of the stationary guide vanes 108 are positioned at least partially aft of the aft edge 114 of the wing body 100. Notably, the relative positioning of the aft edges 116 of the stationary guide vanes 108 and the aft edge 114 of the wing body 100 refers to a relative positioning along the longitudinal direction L of the aircraft 10.

It will be appreciated, however, that in other exemplary embodiments, the wing tip assembly 102 of the first wing 22A of the aircraft 10 may have any other suitable configuration for de-swirling an airflow over the outer end 104 of the first wing 22A. For example, FIGS. 5 and 6 each provide a close-up, forward view of an outer end 104 of a first wing 22A of an aircraft 10 in accordance with other exemplary embodiments of the present disclosure. The exemplary embodiments of FIGS. 5 and 6 may be configured in substantially the same manner as exemplary embodiment described above with reference FIGS. 1 through 4. Accordingly, the same numbers may refer to the same parts.

As is shown, the first wings 22A each generally include a wing body 100 and a wing tip assembly 102, the wing tip assembly 102 positioned at an outer end 104 of the respective first wing 22A along the transverse direction T. The wing tip assemblies 102 each define an axis 106, which it will be appreciated is substantially parallel to a longitudinal direction L of the aircraft 10, as well as a circumferential direction C extending about the axis 106 and a radial direction R relative to the axis 106. Moreover, the wing tip assemblies 102 each include a plurality of stationary guide vanes 108 spaced along the circumferential direction C from one another.

Figure 5:
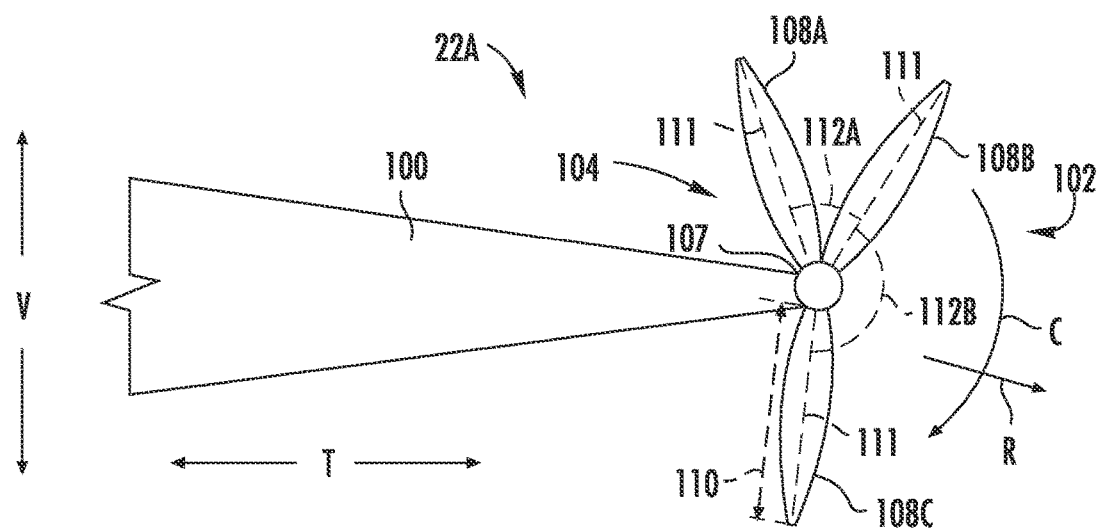
FIG. 5 is a close-up, forward view of an outer end of a wing in accordance with another exemplary embodiment of the present disclosure.

Referring particularly to FIG. 5, the lengths 110 of each of the plurality of stationary guide vanes 108 of the wing tip assembly 102 depicted are substantially equal to one another. However, for the embodiment shown, the stationary guide vanes 108 of the wing tip assembly 102 instead define a variable spacing (i.e., angular spacing 112) between one another along the circumferential direction C. For example, for the embodiment shown, the wing tip assembly 102 depicted includes three (3) stationary guide vanes 108. Further, the wing tip assembly 102 defines a first spacing 112A between a first stationary guide vane 108A and a second stationary guide vane 108B, and a second spacing 112B between the second stationary guide vane 108B and a third stationary guide vane 108C. For the embodiment shown, the second spacing 112B is greater than the first spacing 112A. The variable spacing between each adjacent stationary guide vane 108 between the first and last stationary guide vane 108 (i.e., stationary guide vane 108A and stationary guide vane 108C for the embodiment of FIG. 5) may be within the range determined 360°/(n+1)±180°/(n+1), where "n" is the number of stationary guide vanes 108. In such a manner, the spacing for each stationary guide vane 108 may vary by a "half passage" from stationary guide vane 108 to stationary guide vane 108. For example, for the embodiment depicted, the spacings 112 between adjacent stationary guide vanes 108 may vary from 45° (i.e., 360°/4−180°/4) and 135° (i.e., 360°/4+180°/4). Of course, in other embodiments having other numbers of stationary guide vanes 108, the spacings 112 between adjacent stationary guide vanes 108 may vary by other degrees determined by the above formula.

Figure 6:
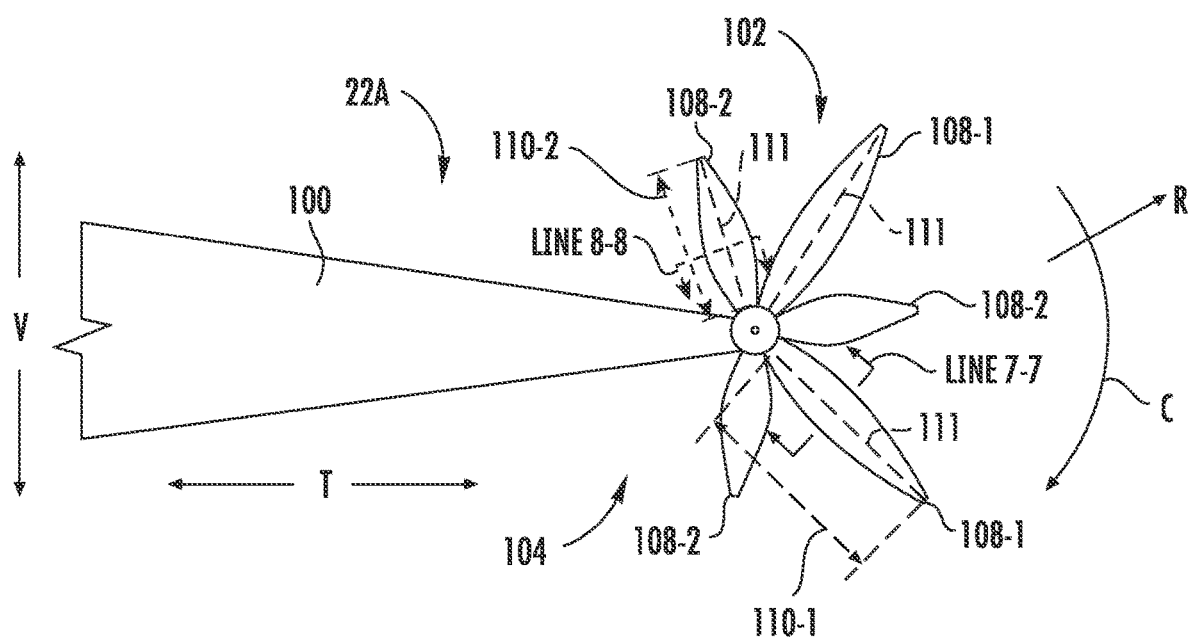
FIG. 6 is a close-up, forward view of an outer end of a wing in accordance with yet another exemplary embodiment of the present disclosure.

Further, referring now particularly to the embodiment of FIG. 6, for the embodiment shown, each of the plurality of stationary guide vanes 108 of the wing tip assembly 102 are spaced substantially equally from one another along the circumferential direction C. However, by contrast to the exemplary embodiment of FIG. 5, for the embodiment of FIG. 6, not all of the stationary guide vanes 108 are the same size. More specifically, for the embodiment of FIG. 6, the plurality stationary guide vanes 108 of the wing tip assembly 102 includes a first set of stationary guide vanes 108-1 and a second set of stationary guide vanes 108-2. Each stationary guide vane 108 of the first set of stationary guide vanes 108-1 defines a length substantially equal to a first length 110-1, and each stationary guide vane 108 of the second set of stationary guide vanes 108-2 defines a length substantially equal to a second length 110-2. For the embodiment shown, the first length 110-1 is greater than the second length 110-2, such as at least about fifteen percent greater and the second length 110-2, such as at least about twenty-five percent greater than the second length 110-2, such as at least about seventy-five percent greater than the second length 110-2, such as up to about three hundred percent greater than the second length 110-2. More specifically, for the embodiment of FIG. 6, the first length 110-1 is about one hundred percent greater than the second length 110-2.

Further, for the embodiment of FIG. 6, it will be appreciated that the first set of stationary guide vanes 108-1 is at least partially alternatingly spaced with the second set of stationary guide vanes 108-2. More particularly, for the embodiment of FIG. 6, the first set of stationary guide vanes 108-1 is completely alternatingly spaced with the second set of stationary guide vanes 108-2. It will be appreciated, that as used herein, the term "at least partially alternatingly spaced" with reference to the first and second sets of stationary guide vanes 108-1, 108-2 refers to at least one stationary guide vane 108 of one set of stationary guide vanes 108 being positioned between two adjacent stationary guide vanes 108 of the other set of stationary guide vanes 108. Further, the term "completely alternatingly spaced" refers to each of the stationary guide vanes 108 of one set of stationary guide vanes 108 being positioned between adjacent stationary guide vanes 108 of the other set of stationary guide vanes 108.

By including a second set of stationary guide vanes 108-2 having a shorter length, the wing tip assembly 102 of the first wing 22A may include a greater solidity of stationary guide vanes 108 proximate the axis 106 of the wing tip assembly 102 (i.e., at a radially inward position as compared to a radially outward position), which may increase an effectiveness of the wing tip assembly 102 in reducing a swirl over the outer end 104 of the first wing 22A.

Figure 7:
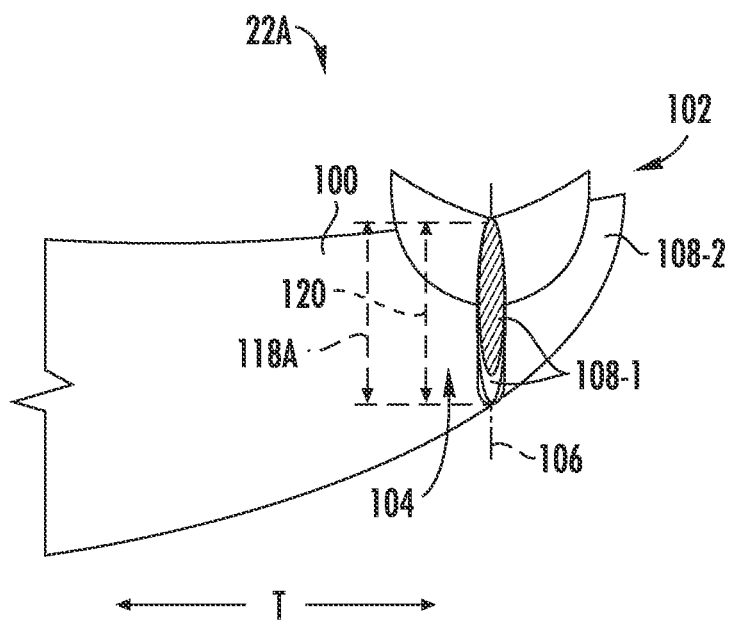
FIG. 7 is a cross-sectional view of one stationary guide vane of a first set of stationary guide vanes, along Line 7-7 of FIG. 6.
Figure 8:
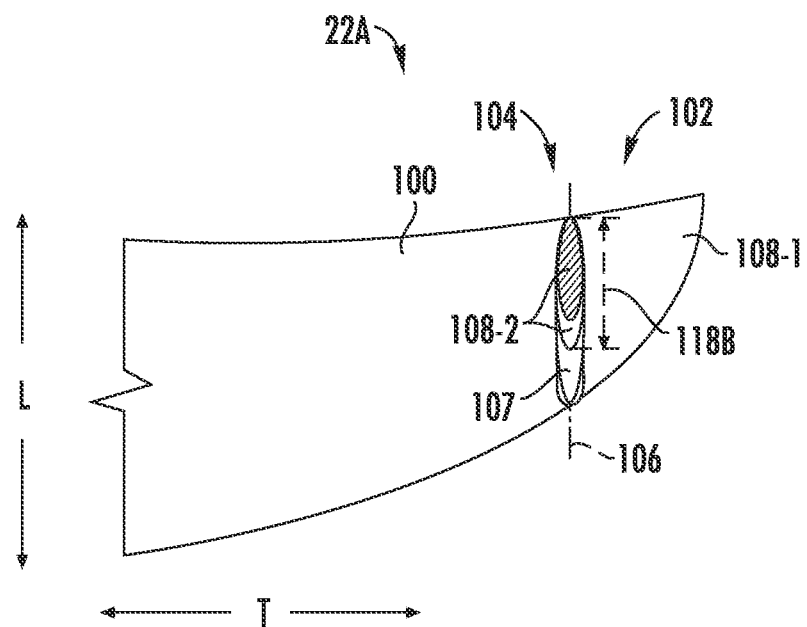
FIG. 8 is a cross-sectional view of a second stationary guide vane of a second set of stationary guide vanes, along Line 8-8 of FIG. 6.

Reference will now also be made to FIGS. 7 and 8. FIG. 7 provides a cross-sectional view of one stationary guide vane 108 of the first set of stationary guide vanes 108-1, along Line 7-7 of FIG. 6, and FIG. 8 provides a cross-sectional view of one stationary guide vane 108 of the second set of stationary guide vanes 108-2, along Line 8-8 of FIG. 6. Referring to FIGS. 7 and 8, it will be appreciated that for the embodiment shown, the plurality of stationary guide vanes define a variable chord length between the first and second sets of stationary guide vanes 108-1, 108-2. More specifically, referring particularly to FIG. 7, the stationary guide vanes 108 of the first set of stationary guide vanes 108-1 defines a maximum chord length 118A, which for the embodiment shown is defined at a base portion of the stationary guide vanes 108 of the first set of stationary guide vanes 108-1. Notably, the first wing 22A also defines a chord 120 at the outer end 104. For the embodiment shown, the chord 120 of the first wing 22A is substantially equal to the maximum chord length 118A of the stationary guide vanes 108 of the first set of stationary guide vanes 108-1. Additionally, referring now particularly to FIG. 8, the stationary guide vanes 108 of the second set of stationary guide vanes 108-2 also define a maximum chord length 118 B, which for the embodiment shown is similarly defined at a base portion of the stationary guide vanes 108 of the second set of stationary guide vanes 108-2. As is depicted, the maximum chord length 118 A is greater than the maximum chord length 118 B, such as at least about ten percent greater, such as at least about twenty-five percent greater, such as at least about fifty percent greater, such as up to about five hundred percent greater.

Further, it will be appreciated that in certain embodiment, the maximum chord length 118 of any stationary guide vane 108 (i.e., of all the sets of stationary guide vanes) may be less than the chord 120 of the first wing 22A at the outer end 104 (i.e., of the wing body 100 adjacent to the wing tip assembly 102).

It will be appreciated, however, that in other exemplary embodiments, the plurality of stationary guide vanes 108 of the wing tip assembly 102 may have any other suitable configuration. For example, in other exemplary embodiments, the first and second sets of stationary guide vanes 108-1, 108-2 may include any other suitable number of stationary guide vanes 108. For example, in other exemplary embodiments one of the first or second sets of stationary guide vanes 108-1, 108-2 may only include a single stationary guide vane 108. Further, in other exemplary embodiments, the plurality of stationary guide vanes 108 may include any other suitable number of sets of stationary guide vanes 108. For example, in other exemplary embodiments, the wing tip assembly 102 may include three or more sets of stationary guide vanes 108 (e.g., three, four, five, six, seven, eight, nine, ten, eleven, twelve, etc. sets of guide vanes 108), and in one or more of these embodiments, each of the plurality of stationary guide vanes 108 may define a different length 110.

Figure 9:
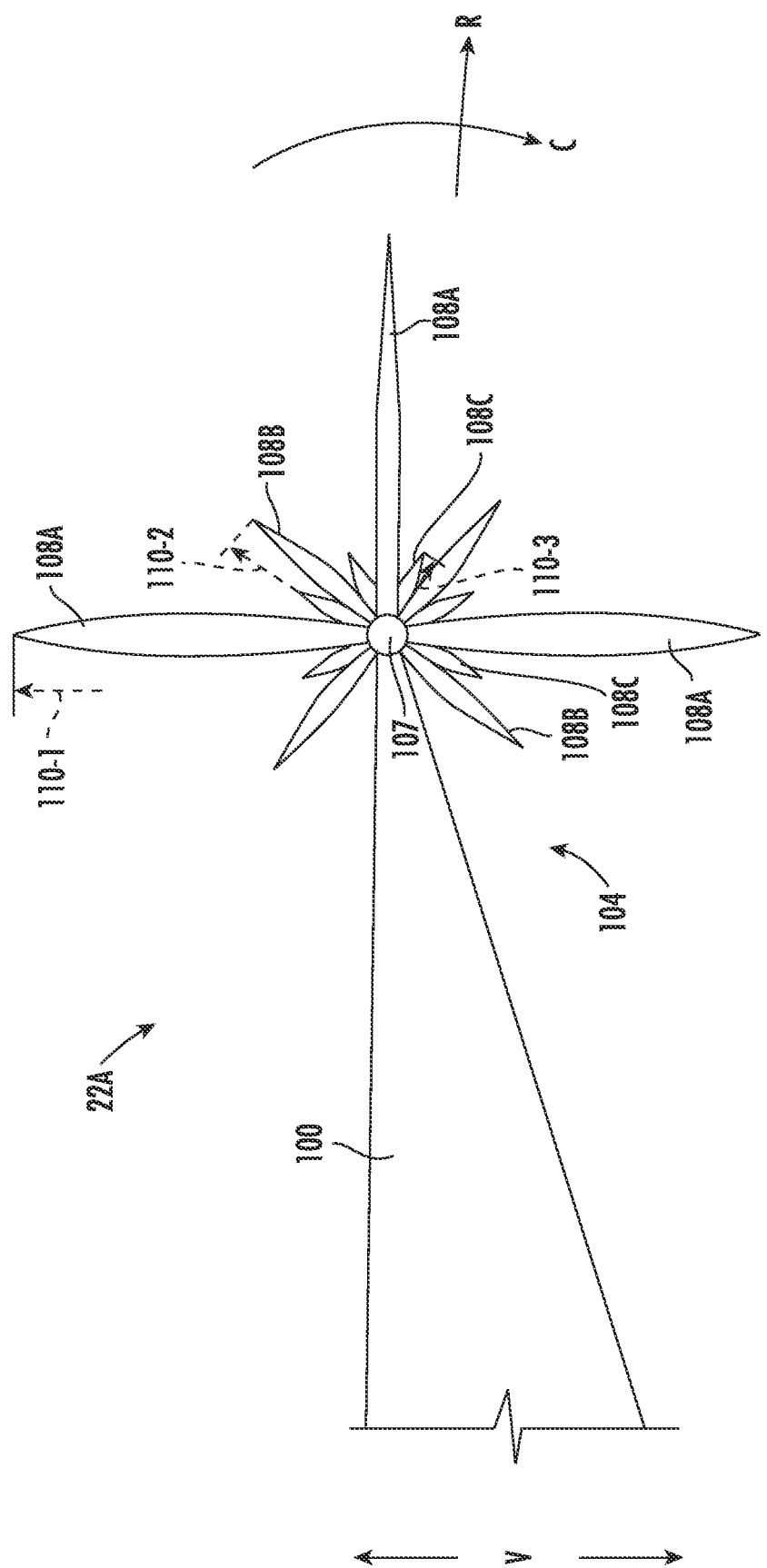
FIG. 9 is a close-up, forward view of an outer end of a wing in accordance with still another exemplary embodiment of the present disclosure.

By way of example only, referring briefly to FIG. 9, in at least one embodiment, the plurality of stationary guide vanes 108 may include three sets of stationary guide vanes 108, with the first set of guide vanes 108A having at least two guide vanes 108A (such as at least three or at least four guide vanes 108A, such as up to fifteen guide vanes 108A, and more specifically three guide vanes 108A for the embodiment depicted), each having a first length 110-1; the second set of guide vanes 108B having at least two guide vanes 108B (such as at least three or at least four guide vanes 108B, such as up to fifteen guide vanes 108B, and more specifically four guide vanes 108A for the embodiment depicted), each having a second length 110-2; and the third set of guide vanes 108C having at least two guide vanes 108 (such as at least three or at least four guide vanes 108C, such as up to fifteen guide vanes 108C, and more specifically six guide vanes 108A for the embodiment depicted), each having a third length 110-3. With such an embodiment, the first length 110-1 may be greater than the second and third lengths 110-2, 110-3, and the second length 110-2 may be greater than the third length 110-3 (e.g., the first length 110-1 may be at least about 100% greater than the second length 110-2, and the second length 110-2 may be at least about 100% greater than the third length 110-3).

Additionally, each guide vane of the third set of guide vanes 108C may be spaced between each adjacent first and/or second guide vane 108A, 108B, and each guide vane of the second set of guide vanes 108B may be spaced between each adjacent pair of first guide vane 108A. In such a manner, there are more third guide vanes 108C than second guide vanes 108B, and more second guide vanes 108B than first guide vanes 108A.

However, other configurations may be provided as well.

Figure 10:
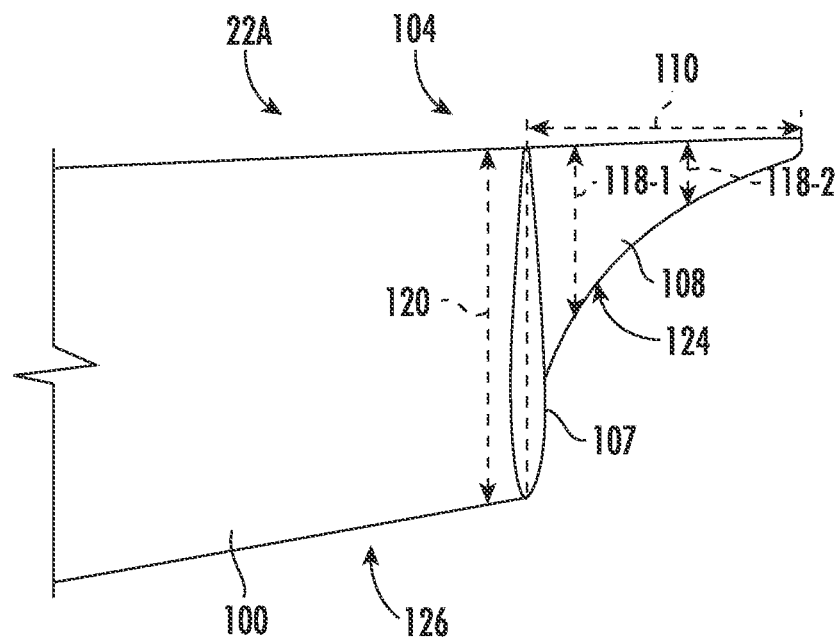
FIG. 10 a top-down view of a stationary guide vane in accordance with an exemplary embodiment of the present disclosure.

Moreover, referring now to FIG. 10, a top-down view of a stationary guide vane 108 in accordance with an exemplary embodiment of the present disclosure is provided. The guide vane 108 depicted in FIG. 10 may be incorporated into one or more of the embodiments described above. As is depicted, the exemplary stationary guide vane 108 defines a chord 118, a leading edge 124, and a length 110. The length 110 is relative to an axis 106 of a hub 107. Notably, for the embodiment depicted, the leading edge 124 is coupled to the hub 107 at a location aft of a leading edge 126 of the wing 22A, such as at a location aft of the leading edge 126 of the wing 22A by at least about ten percent (10%) of the chord 120 of the wing 22A at the outer end 104, such as by at least about twenty-five percent (25%) of the chord 120 of the wing 22A at the outer end 104.

Additionally, it will also be appreciated that for the embodiment depicted the leading edge 124 of the of the stationary guide vane 108 defines a substantially concave shape (i.e., at least about 75% of the leading edge, when viewed together, defines a concave shape). More specifically, the relationship between the chord 118 of the stationary guide vane 108 and the length 110 of the stationary guide vane 108 is not a 1:1 relationship. Instead, the chord 118 of the stationary guide vane 108 tapers toward zero toward the radially outer tip. More specifically, for the exemplary embodiment depicted, the relationship is substantially a "1/X" relationship (i.e., the chord 118 of the stationary guide vane 108 at a given distance from the axis 106 is substantially scaled down with an increase in the distance to the axis 106). However, in other embodiments, the leading edge 124 of the stationary guide vane may define any other suitable concave shape, any other suitable curved shape (such as a convex shape), or any other suitable non-curved shape (e.g., a linear shape).

Figure 11:
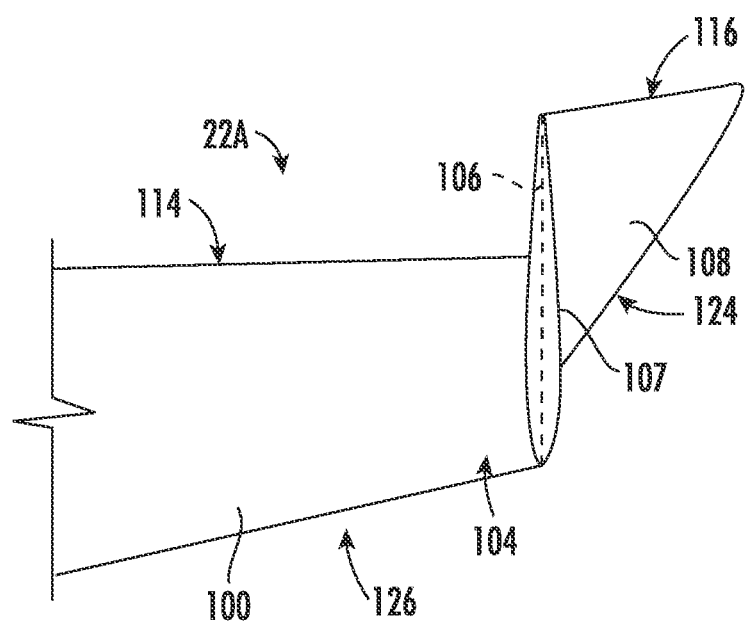
FIG. 11 a top-down view of a stationary guide vane in accordance with another exemplary embodiment of the present disclosure.

Further, still, referring now to FIG. 11, a top-down view of a stationary guide vane 108 in accordance with another exemplary embodiment of the present disclosure is provided. The guide vane 108 depicted in FIG. 11 may be incorporated into one or more of the embodiments described above. As is depicted, the exemplary stationary guide vane 108 defines a leading edge 124 and a trailing edge 116, and is coupled to a hub 107 defining an axis 106 positioned at an outed end 104 of a wing 22A. Additionally, the wing 22A defines a trailing edge 114 at the outer end 104.

Notably, however, for the embodiment depicted, the stationary guide vane 108 is coupled to hub 107 at a location such that the entirety of the trailing edge 116 of the stationary guide vane 108 is located aft of the trailing edge 114 of the wing 22A. Additionally, the hub 107 extends aft of the trailing edge 114 of the wing 22A. Further, at least a portion of the leading edge 124 of the stationary guide vane 108 is also positioned aft of the trailing edge 114 of the wing 22A at the outer end 104. In at least certain exemplary embodiments, each of the stationary guide vanes 108 may be positioned in such a manner to further assist with deswirling an airflow.

Notably, although the embodiments described above with reference to FIGS. 3 through 11 refer to a wing tip assembly 102 of a first wing 22A of an aircraft 10, it will be appreciated that in other embodiments, the aircraft 10 may further include a second wing 22B having a similar wing tip assembly 102. The wing tip assembly 102 of the second wing 22B may be a symmetric mirror image of the wing tip assembly 102 described above. For example, in certain embodiments, the second wing 22B may further include a wing tip assembly 102 at an outer end along the transverse direction T with the wing tip assembly 102 defining an axis substantially parallel to the longitudinal direction L of the aircraft 10 and a circumferential direction C extending about this axis. The wing tip assembly 102 of the second wing 22B may also include a plurality of stationary guide vanes 108 spaced from one another along the circumferential direction C of the wing tip assembly 102 of the second wing 22B, such as at least about three (3) stationary guide vanes 108 spaced from one another along the circumferential direction C of the wing tip assembly 102 of the second wing 22B. One exemplary embodiment of such a configuration may be seen in, e.g., FIGS. 1 and 2.

Further, still, although the exemplary embodiments discussed above are disclosed as including the wing tip assembly 102 at the outer end of a wing of an aircraft, in other exemplary embodiments, similar tip assemblies may be positioned at the end of any other suitable airfoil, such that they may be referred to as "airfoil tip assemblies," such as at the outer end of an airfoil of an engine (i.e., any machine capable of generating power). For example, in other embodiments, the "wing" tip assembly 102 may be positioned at the outer end of a rotor or stator of an unducted fan assembly, at the outer end of a propeller or fan blade, at the outer end of a wind turbine fan blade, at the outer end of a marine application propeller blade, etc.

It will be appreciated that inclusion of a wing having a wing tip assembly in accordance with one or more exemplary embodiments of the present disclosure will reduce a swirl over an outer end of such wing. More specifically, due to a pressure differential between a bottom side of the wing and a top side of the wing, the airflow over the bottom side of the wing may tend to swirl around the outer end of the wing to the top side. Such swirling creates wing tip vortices in an aircraft wake, leading to an increased induced drag on the aircraft wings, reducing an efficiency of the aircraft. By including a wing tip assembly having a plurality of stationary guide vanes arranged in accordance with one or more the embodiments described herein, the wing tip assembly may straighten out this swirl in the airflow (i.e., de-swirl the airflow) more effectively to reduce the induced drag on the aircraft wings, and improve an overall efficiency of the aircraft. Notably, providing at least three stationary guide vanes in accordance with one or more of the exemplary embodiments described herein may have the unexpected benefit of reducing the overall drag, despite the inclusion of additional structure extending from the wing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A wing assembly comprising:
   an airfoil extending along a transverse direction and defining an outer end along the transverse direction and defining an airfoil chord length at the outer end,
   the airfoil comprising an airfoil tip assembly at the outer end of the airfoil,
   the airfoil tip assembly defining an axis and a circumferential direction extending about the axis, the airfoil tip assembly comprising at least three stationary guide vanes spaced along the circumferential direction from one another, wherein each stationary guide vane of the at least three stationary guide vanes defines a maximum chord length greater than or equal to 90% of the airfoil chord length and less than or equal to 110% of the airfoil chord length.

2. The wing assembly of claim 1, wherein the plurality of stationary guide vanes of the airfoil tip assembly define a variable spacing between one another along the circumferential direction.

3. The wing assembly of claim 2, wherein a spacing between each adjacent pair of stationary guide vanes is less than an angle defined by an equation $360°/(n+1)+180°/(n+1)$, and greater than an angle defined by an equation $360°/(n+1)-180°/(n+1)$, where "n" is equal to the number of stationary guide vanes.

4. The wing assembly of claim 1, wherein a first stationary guide vane of the at least three stationary guide vanes of the airfoil tip assembly defines a leading edge having a substantially concave shape.

5. The wing assembly of claim 1,
wherein a first stationary guide vane of the at least three stationary guide vanes of the airfoil tip assembly defines a leading edge and a trailing edge,
wherein the airfoil defines a trailing edge at the outer end, and
wherein the leading edge of the first stationary guide vane is at least partially forward of the trailing edge of the airfoil, and wherein the trailing edge of the first stationary guide vane is at least partially aft of the trailing edge of the airfoil.

6. The wing assembly of claim 1, wherein each of the at least three stationary guide vanes defines an aft edge, wherein the airfoil defines an aft edge at the outer end, and wherein the aft edges of the stationary guide vanes are at least partially aligned with the aft edge of the airfoil, or positioned at least partially aft of the aft edge of the airfoil.

7. The wing assembly of claim 1, wherein each of the at least three stationary guide vanes is formed integrally with the airfoil.

8. A wing assembly comprising:
an airfoil extending along a transverse direction and defining an outer end along the transverse direction,
the airfoil comprising an airfoil tip assembly at the outer end of the airfoil,
the airfoil tip assembly defining an axis and a circumferential direction extending about the axis,
the airfoil tip assembly comprising at least three stationary guide vanes spaced along the circumferential direction from one another, wherein each stationary guide vane of the at least three stationary guide vanes defines a maximum chord length, wherein the maximum chord length of a first stationary guide vane of the at least three stationary guide vanes is greater than the maximum chord length of a second stationary guide vane of the at least three stationary guide vanes.

9. The wing assembly of claim 8, wherein the maximum chord length of the first stationary guide vane of the at least three stationary guide vanes is at least 10% greater than the maximum chord length of the second stationary guide vane of the at least three stationary guide vanes.

10. The wing assembly of claim 8, wherein the maximum chord length of the first stationary guide vane of the at least three stationary guide vanes is at least 25% greater than the maximum chord length of the second stationary guide vane of the at least three stationary guide vanes.

11. A wing assembly comprising:
an airfoil extending along a transverse direction and defining an outer end along the transverse direction,
the airfoil comprising an airfoil tip assembly at the outer end of the airfoil,
the airfoil tip assembly defining an axis and a circumferential direction extending about the axis,
the airfoil tip assembly comprising at least three stationary guide vanes spaced along the circumferential direction from one another, wherein the airfoil tip assembly defines an axis, and wherein each of the at least three stationary guide vanes overlaps one another along the axis.

12. The wing assembly of claim 11, wherein each of the at least three stationary guide vanes comprises a base, and wherein the bases of each of the three stationary guide vanes overlap along the axis.

* * * * *